(No Model.)  S. B. GILLILAND.  2 Sheets—Sheet 1.
HAY RAKE.
No. 423,146.  Patented Mar. 11, 1890.
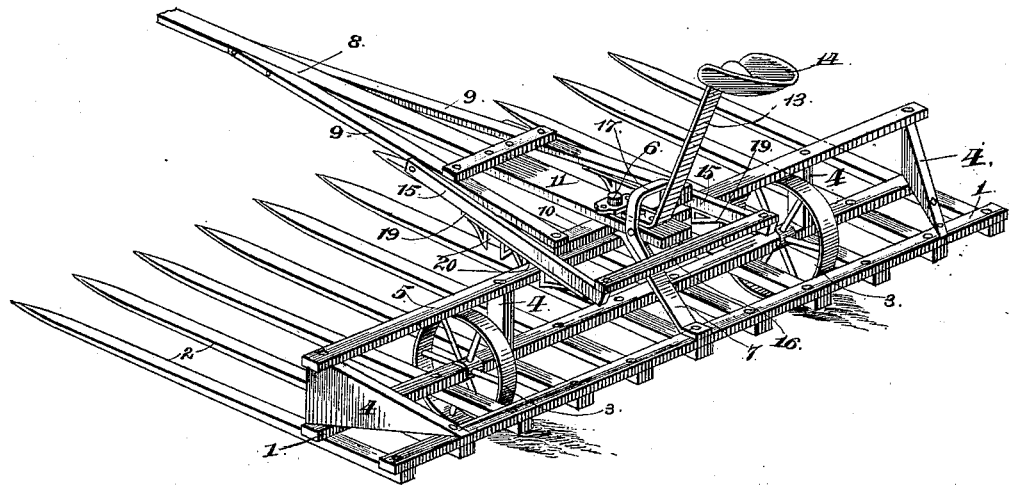
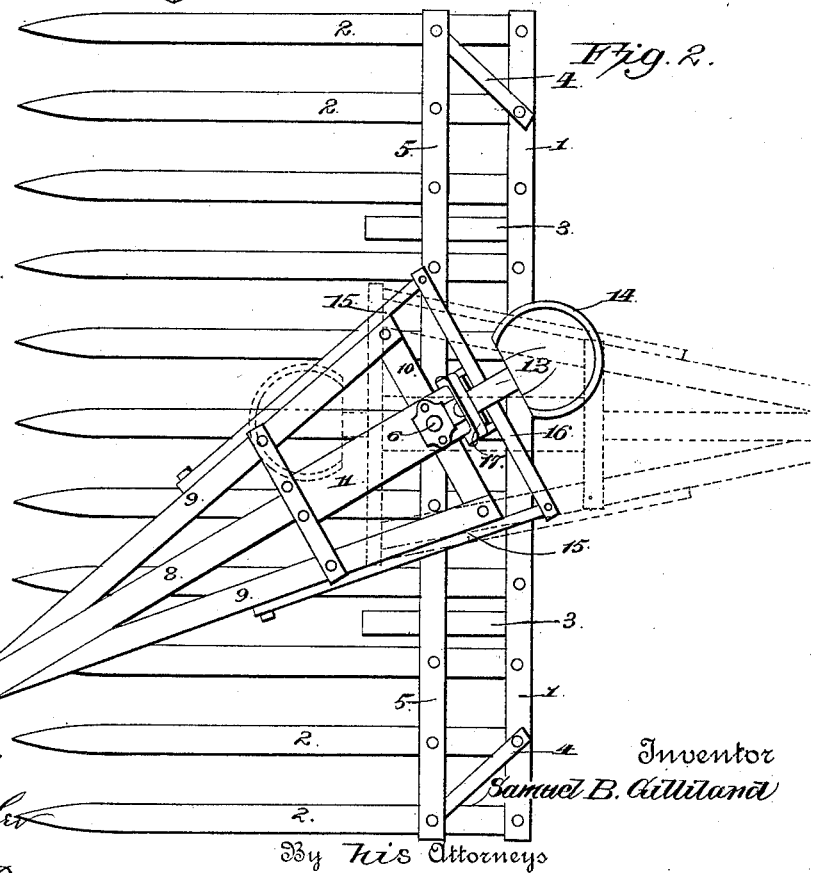

(No Model.) 2 Sheets—Sheet 2.

S. B. GILLILAND.
HAY RAKE.

No. 423,146. Patented Mar. 11, 1890.

Witnesses
M. Fowler
Wm. Bagger

Inventor
Samuel B. Gilliland
By his Attorneys
C. A. Snow & Co.

UNITED STATES PATENT OFFICE.

SAMUEL B. GILLILAND, OF MONROE CITY, MISSOURI.

HAY-RAKE.

SPECIFICATION forming part of Letters Patent No. 423,146, dated March 11, 1890.

Application filed October 26, 1889. Serial No. 328,236. (No model.)

*To all whom it may concern:*

Be it known that I, SAMUEL B. GILLILAND, a citizen of the United States, residing at Monroe City, in the county of Monroe and State of Missouri, have invented a new and useful Hay-Rake, of which the following is a specification.

This invention relates to that class of hay-rakes which are used in connection with hay-stacking machines of that class in which an elevating-platform is used in connection with mechanism for elevating the contents of said platform and depositing it upon the stack.

In hay-rakes of this class a common objection has been that it has been difficult to transfer the load from the rake to the stacker-platform. This has heretofore been accomplished either by hitching the horses at the sides of the rake or in rear of the rake-head, thus enabling the body of the rake to be pushed across the platform; but either method has been objectionable, for the reason that it has been found exceedingly difficult to manage the rake properly. By my present invention I aim to overcome these disadvantages by providing the rake with a pivoted tongue and means for securing the said tongue in different positions with relation to the rake-head, thus enabling a straight draft to be used while the hay is being gathered and enabling the tongue to be adjusted obliquely, and thus permitting the horse to walk at the side of the stacker-platform while the load is being transferred, and also enabling the tongue to be swung completely around for the purpose of withdrawing the rake from the stacker-platform, all as will be hereinafter more fully described, and particularly pointed out in the claims.

Figure 3:
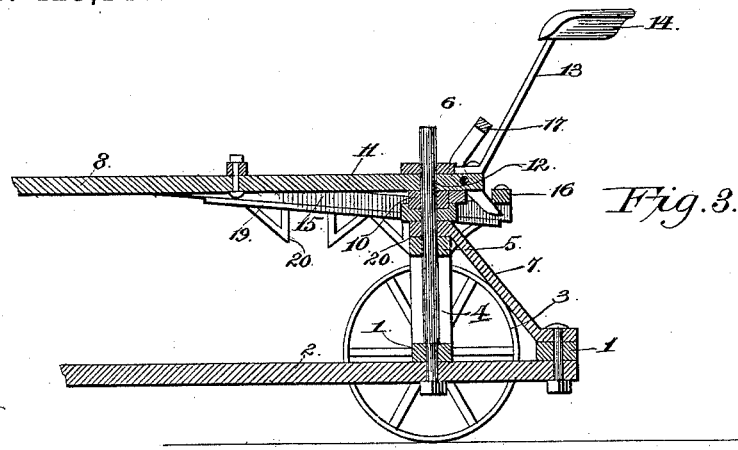
Figure 4:
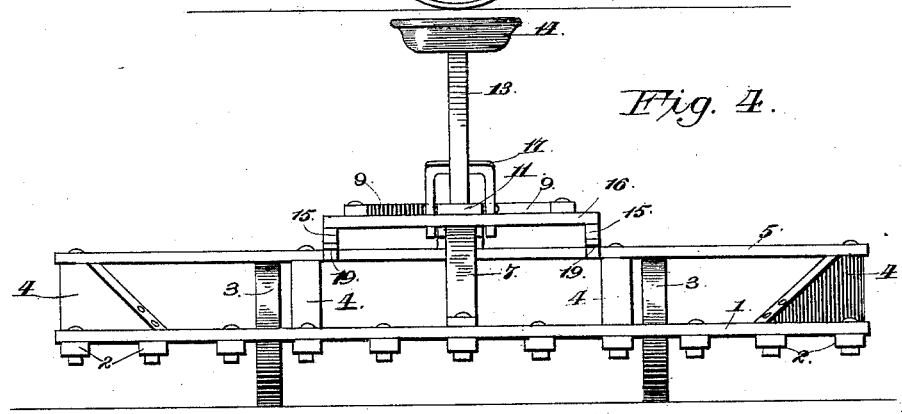
Figure 5:
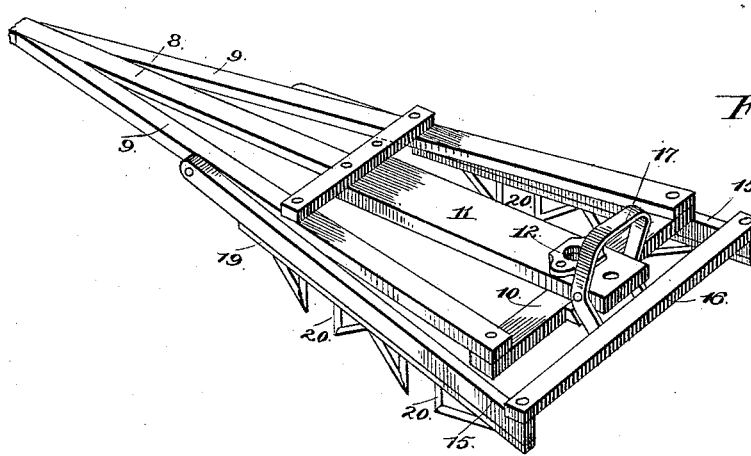

In the drawings hereto annexed, Figure 1 is a perspective view of my improved hay-rake. Fig. 2 is a plan view of the same, showing it in the act of transferring its load to a stacker-platform. Fig. 3 is a longitudinal sectional view of the rake. Fig. 4 is a rear elevation of the same. Fig. 5 is a perspective view of the tongue and the adjusting mechanism detached from the rake-head.

Like numerals of reference indicate like parts in all the figures.

The rake which is used in connection with my invention may be of any suitable construction. In the illustrations hereto annexed it comprises a pair of transverse guards 1 1, to which a series of longitudinal fingers or tines 2 2 have been attached in any suitable manner. The front bar 1 is provided with spindles or bearings for the wheels 3 3, and a series of blocks 4 4, mounted upon the bars 1 1, serve to support the head-bar 5.

6 designates a vertical spindle, the lower end of which is secured centrally to the front cross-bar 1, and the upper end of which extends through the head-bar 5. A brace 7 connects the said spindle with the rear transverse bar 1.

8 designates a tongue, which is provided with rearwardly-diverging bars or braces 9 9, the rear ends of which are connected by a cross-bar 10, which extends transversely under the tongue. A bearing-plate 11 is secured upon the upper side of the latter, and a vertical perforation 12, forming a bearing for the spindle 6, is formed in the rear end of the tongue and through the cross-bar 10 and the bearing-plate 11. A seat-bar 13, the upper end of which carries the driver's seat 14, is secured at the upper end of the tongue. It will be seen that by the vertical perforations or bearings 12 the tongue with its attachments may be mounted pivotally upon the upper side of the rake.

To the outer sides of the diverging braces 9 of the tongue are secured pivotally the rearwardly-extending arms 15 15, the rear ends of which are connected by a cross-bar 16, thereby forming a pivoted frame which is supported upon the arms of a yoke or bail 17, which is mounted pivotally upon the rear end of the tongue, and the cross-bar of which forms a foot-lever which may be conveniently operated by the driver. To the under sides of the pivoted arms 15 are bolted or otherwise secured the castings 19, each of which is provided with a pair of notches 20. The under sides of the castings 19 should be sloped gradually toward the ends of the said notches. When the arms 15 are constructed of metal, the notches 20 may be formed directly in the under sides thereof; but for the sake of lightness and cheapness I prefer to attach the notched castings thereto, as above described.

The notches 20 are so located with relation to each other and to the rake-head that when the bar or head 5 engages the rear notches the tongue 8 shall be at right angles to the rake-head. The tongue may be adjusted obliquely on either side of the rake-head by causing either of the forward notches to engage the rake-head 5.

The operation and advantages of my invention will be readily understood from the foregoing description, taken in connection with the drawings hereto annexed. The hinged frame, comprising the arms 15 and the cross-bar 16, normally by its own weight rests upon the head-bar 5 of the rake, causing the latter to engage either the rear or one of the front notches, as the case may be. When it is desired to change the position of the tongue with relation to the rake-head, the driver merely presses with his foot upon the cross-bar of the yoke or bail 17, thereby elevating the rear end of the pivoted frame and disengaging the notches in the under side of the latter from the head-bar of the rake. The tongue may then be easily swung around to the desired position. It is obvious that in the act of gathering the load the horses will walk in front of the rake closely together. When the load is to be transferred from the rake to the stacker-platform, the tongue is swung around obliquely to either side, thus enabling the horses to walk forward at either side of the stacker-platform while the load is being transferred. When this has been accomplished, the tongue may be swung completely around, as shown in dotted lines in Fig. 2 of the drawings, thereby enabling the rake to be withdrawn from the stacker-platform. When this has been done, the tongue is again swung around to its normal position in front of and at right angles to the rake-head, and the operation of gathering a load may be proceeded with as before.

Having thus described my invention, I claim—

1. The tongue mounted pivotally upon the rake and having pivoted arms provided with notches for the purpose of holding the rake in position while in operation, substantially as set forth.

2. The rake-head having the tongue mounted pivotally thereon, said tongue being provided with hinged arms having notches to engage the said rake-head, a cross-bar connecting the rear ends of said hinged bars, and a foot-lever or yoke to support the said cross-bar and to operate the said pivoted arms, substantially as set forth.

3. The rake having the vertical stem or spindle provided with the tongue mounted pivotally upon said stem or spindle and having pivoted arms provided with notches adapted to engage the rake head and hold the tongue at the desired angle of adjustment, substantially as set forth.

4. The tongue mounted pivotally upon the rake-head and carrying the driver's seat, a pivoted frame mounted on the tongue and having notches or catches to engage the rake-head, and a foot-lever adapted to support and operate the free end of said pivoted frame, substantially as set forth.

5. The combination of the hay-rake having the vertical spindle, the tongue mounted pivotally upon the said spindle and having rearwardly-diverging arms or braces, the arms pivoted to the outer sides of said braces and having notches or catches in their under sides, a cross-bar connecting the rear ends of said pivoted arms, and a foot-lever to support the said cross-bar and to operate the pivoted frame composed of the cross-bar and the pivoted arms, substantially as set forth.

6. The combination of the hay-rake having the upwardly-extending spindle, the tongue having rearwardly-diverging braces connected at their rear ends by a cross-bar extending under the rear end of the tongue, a bearing-plate upon the upper side of the latter, a vertical perforation extending through the said cross-bar, tongue, and bearing-plate, the arms pivoted to the outer sides of the diverging braces and having notches or catches on their under sides, a cross-bar connecting the rear ends of said arms, a foot-lever arranged to support and operate the latter, and the driver's seat mounted upon the rear end of the tongue, substantially as set forth.

In testimony that I claim the foregoing as my own I have hereto affixed my signature in presence of two witnesses.

SAMUEL B. GILLILAND.

Witnesses:
WILLIAM T. RAGLAND,
JOHN T. LIGHTER.